US012694776B2

(12) United States Patent
Peters et al.

(10) Patent No.: US 12,694,776 B2
(45) Date of Patent: Jul. 28, 2026

(54) ATTACHABLE ALARM SYSTEM

(71) Applicant: Birdie Love Inc., Berkeley, CA (US)

(72) Inventors: Alison Peters, Los Angeles, CA (US); Amy Ferber, Berkeley, CA (US)

(73) Assignee: Birdie Love Inc., Berkeley, CA (US)

( * ) Notice: Subject to any disclaimer, the term of this patent is extended or adjusted under 35 U.S.C. 154(b) by 0 days.

(21) Appl. No.: 18/954,319

(22) Filed: Nov. 20, 2024

(65) Prior Publication Data

US 2026/0141794 A1 May 21, 2026

(51) Int. Cl.
*G08B 21/02* (2006.01)
*G08B 7/06* (2006.01)

(52) U.S. Cl.
CPC ............... *G08B 21/02* (2013.01); *G08B 7/06* (2013.01)

(58) Field of Classification Search
CPC ................................. G08B 21/02; G08B 7/06
See application file for complete search history.

(56) References Cited

U.S. PATENT DOCUMENTS 5,473,305 A * 12/1995 Hwang ............... B60R 25/1003 180/287
7,868,743 B1 * 1/2011 Brown .................. G01G 19/56 177/12
11,540,753 B1 1/2023 Wilcox
2009/0289807 A1 11/2009 Enwright
2011/0059719 A1 * 3/2011 Spielvogel ........ H04M 1/72424 455/404.1
2014/0180019 A1 * 6/2014 Martinez ................ A61B 5/681 600/300
2014/0259438 A1 * 9/2014 Rubin ..................... B25F 1/006 7/163
2016/0180697 A1 6/2016 Ros
2018/0122195 A1 5/2018 Schmidt
2018/0211509 A1 * 7/2018 Ramaci ................. A61J 7/0481
2019/0172571 A1 * 6/2019 Ramaci .................. G16H 20/30

OTHER PUBLICATIONS

PCT International Search Report and Written Opinion, International Application No. PCT/US2025/050795, mailed Jan. 13, 2026. 11 pages.

* cited by examiner

*Primary Examiner* — Brian Wilson
(74) *Attorney, Agent, or Firm* — Esplin & Associates, PC

(57) ABSTRACT

Systems and methods to provide an attachable alarm system are disclosed herein. The attachable alarm system may include a housing with at least openings on the housing; an audible alarm carried by the housing; a light carried by the housing and configured to emit light features; a rechargeable battery, encased within the housing, that powers the audible alarm and the light; a button disposed with the housing, wherein the button, upon different selection combinations, activates the audible alarm and/or one or more of the light features; and a carrier component extended from the housing, wherein the carrier component enables attachment and detachment of the housing to an article or a user.

14 Claims, 4 Drawing Sheets

ATTACHABLE ALARM SYSTEM

FIELD OF THE DISCLOSURE

An attachable and portable alarm system configured to provide an audible alarm and/or light to deter and/or attract attention.

BACKGROUND

Individuals often carry personal protection (e.g., mace, pepper spray, pocketknife) in unsafe circumstances. In such unsafe circumstances, the individuals may desire to activate an audible and/or visual alarm as a deterrent to a threat and/or to draw attention of bystanders. Additionally, the individuals may desire such alarm to be discreet and attachable to themselves or a personal article.

SUMMARY

One aspect of the present disclosure relates to an attachable alarm system. The attachable alarm system may be configured to attach to a user or an article. Therefore, the attachable alarm system may be portable, handsfree, and discreet.

The attachable alarm system may include a housing, an audible alarm, a light, a rechargeable battery, a button, a power switch, a carrier component, and/or other components. The housing may be formed with at least openings on the housing. The audible alarm may be carried by the housing. The light may be carried by the housing and configured to emit light features. The rechargeable battery may be encased within the housing and power the audible alarm and the light. The button may be disposed with the housing. The button, upon different selection combinations, may activate the audible alarm and/or one or more of the light features. The carrier component may extend from the housing. The carrier component may enable attachment and detachment of the housing to the article or the user.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1A:
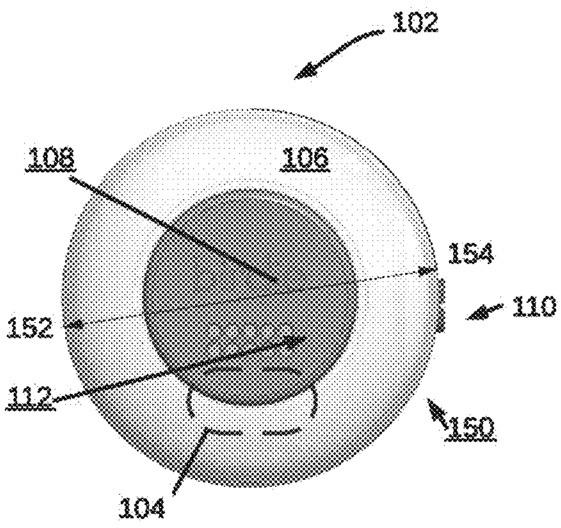
FIG. 1A illustrates a first front view of a housing included in the attachable alarm system, in accordance with one or more implementations.
Figure 5A:
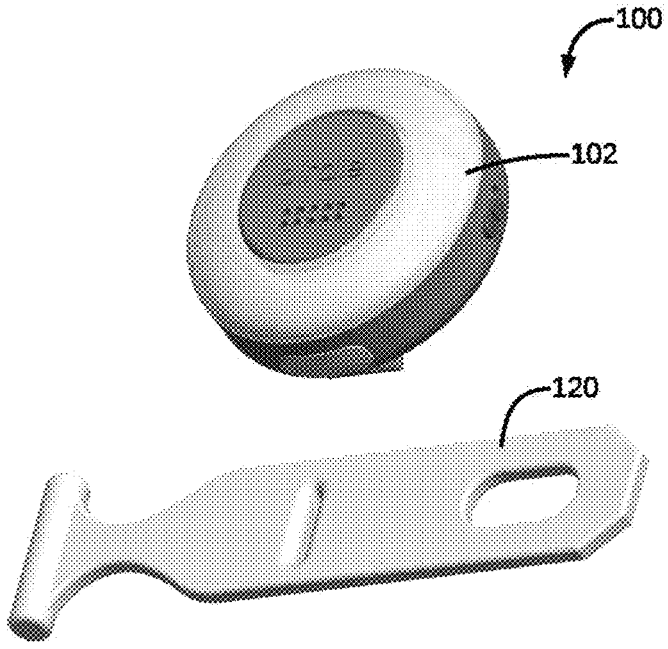
FIG. 5A illustrates the housing detached from the carrier component as the attachable alarm system, in accordance with one or more implementations.
Figure 5B:
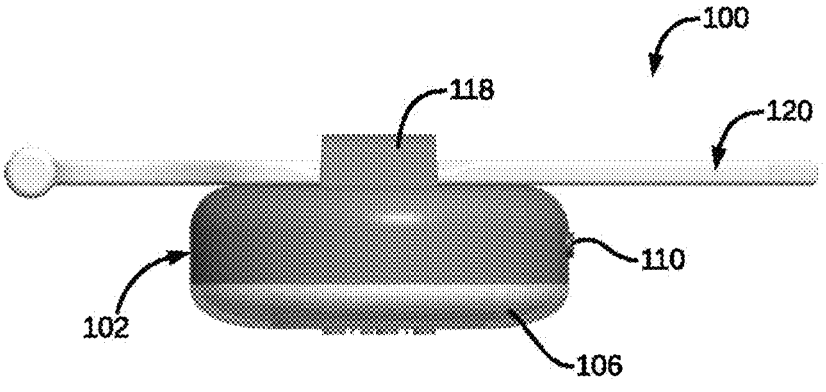
FIG. 5B illustrates the housing attached to the carrier component as the attachable alarm system, in accordance with one or more implementations.

FIG. 1A illustrates a front view of housing 102 included in attachable alarm system 100 illustrated in FIGS. 5A-B, in accordance with one or more implementations. In some implementations, attachable alarm system 100 may be configured of one or more of type of plastic, silicon, metal, and/or other materials.

Figure 1B:
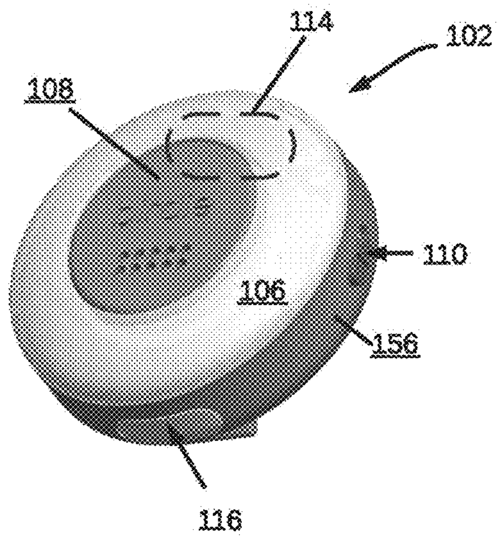
FIG. 1B illustrates a second front view of the housing included in the attachable alarm system, in accordance with one or more implementations.

Referring to FIG. 1A-B, attachable alarm system 100 may include housing 102, an audible alarm 104, a light 106, a button 108, power switch 110, and/or other components. The front view may depict a first side 150 of housing 102. Housing 102 may be disk-shaped, pill shaped, oval-shaped, rectangular, or other shape. Housing 102 may be a size that is discreetly wearable by a user (described herein) and/or attachable to an article. By way of non-limiting example, the size of housing component may have a diameter of 1 inch, 1.2 inches, 1.5 inches, 1.6 inches, or other diameter. By way of non-limiting example, the size of housing component may have a height of 0.25 inches, 0.30 inches, 0.5 inches, or other height. The article may include, but is not limited to, a piece of clothing, an accessory, a wall, a handle (e.g., of a stroller), a doorknob, among other articles. The piece of clothing may include a top (e.g., t-shirt), bottoms (e.g., shorts), a dress, and/or other pieces of clothing. The accessory may include a shoe, jewelry (e.g., a bracelet, a necklace), a scarf, a hat, and/or other accessory. The wall may be part of, for example, a hotel room, a bedroom, a living room, a vehicle, and/or other structure. Housing 102 may be waterproof and/or water safe such that components encased within housing 102 are protected from water that comes into contact with an exterior of housing 102.

Housing 102 may be formed with at least openings 112 on housing 102. In some implementations, openings 112 may be formed on button 108. In some implementations, openings 112 may be formed on a second side 158 of housing 102 illustrated in FIG. 2. Openings 112 may facilitate delivery of sound produced by audible alarm 104. In some implementations, housing 102 may be formed with a single opening 112, such as a circle hole or a square hole. In some implementations, housing 102 may be formed with multiple openings 112 such as multiple circle holes in a line or multiple square holes in two lines. Housing 102 may house a location track device. The location tracking device may be configured to determine a location of alarm system 100 and/or transmit the location of alarm system 100 to one or more remotely located devices (e.g., mobile phone, security centers, etc.). In some implementations, the location tracking device may be configured to transmit the location of alarm system 100 in an ongoing and continuous manner. In some implementations, the location tracking device may be configured to transmit the location of alarm system 100 responsive to an occurrence of an event. By way of non-limiting illustration, the event may include one or more of selection of button 108, activation of audible alarm 104, and/or other types of events. The location tracking device may be a global positioning system (GPS), Bluetooth tracker, Wi-Fi tracker, and/or other types of location tracking devices.

Audible alarm 104 may be unpleasant, loud, high pitched, repetitive, and/or other characteristics to deter a threat and/or draw attention. Audible alarm 104 may be carried by housing 102. In some implementations, audible alarm 104 may be greater than about 120 decibels, 130 decibels, 140 decibels; may be less than about 120 decibels, 130 decibels, 140 decibels; and/or may be within a range bounded at the upper end by any loudness of sound in the former listing of loudness of sound and bounded at the lower end by any loudness of sound in the latter listing of loudness of sound.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of +2 decibels of the given numeric value provided such a deviation does not alter the end function or result of the value. Therefore, a value of about 130 decibels can be construed to be a range from 128 decibels to 132 decibels. Furthermore, a range may be construed to include the start and the end of the range. For example, a range of 120 decibels to 140 decibels (i.e., range of 120-140 decibels) includes 120 decibels and also includes 140 decibels, as well as decibels in between 120 decibels and 140 decibels, unless explicitly stated otherwise herein.

Light 106 may be carried by housing 102 and configured to emit light features. Light 106 may surround a perimeter of button 108 on first side 150 of housing 102. Light 106 may be one or more light-emitting diodes (LED), one or more compact fluorescent lamps (CFL), one or more halogen lamps, one or more incandescent lamps, and/or other bright light. The light features may include one or more colors, presentation patterns, brightness, and/or other light features. By way of non-limiting example, the colors may be one or more of a blue light, a red light, a white light, and/or other colored lights. The presentation patterns may include continuous light presentation, flashing light presentation, perimeter movement presentation, and/or other presentation patterns.

The continuous light presentation may present light 106 in the one or more colors at a particular brightness until termination of the light features. The light features may be terminated in response to the user producing a termination selection combination of button 108. The flashing light presentation may flash or strobe light 106 in the one or more colors at a particular brightness until termination of the light features. The perimeter movement presentation may, in a revolution, emit light 106 in the one or more colors at a particular brightness around a perimeter of light 106 starting at point 152 clockwise towards point 154. As emission of light 106 reaches point 154, light 106 may not emit at point 152. Furthermore, emission of light 106 may continue in the revolution and emit clockwise from point 154 towards point 152. As emission of light 106 reaches point 152, light 106 may not emit at point 154. Such revolution may repeat until termination of the light features.

In some implementations, the brightness may be fixed and unmodifiable. In some implementations, the brightness may be modifiable via particular selection combination of button 108. The brightness may be a particular amount of lumens. By way of non-limiting example, the amount of lumens may be about 300 lumens, 400 lumens, 500 lumens, or other amount of lumens. Increasing the brightness may increase the amount of lumens, and decreasing the brightness may decrease the amount of lumens.

Button 108 may be disposed with housing 102. In some implementations, button 108 may be disposed on first side 150 of housing 102. In some implementations, button 108 may be disposed on second side 158 of housing 102 (illustrated in FIG. 2), on a circumference side 156 of housing 102 (illustrated in FIG. 1B), and/or other location of housing 102.

Button 108, upon different selection combinations, may activate and deactivate audible alarm 104 and/or emission one or more of the light features of light 106. Activation may refer to emission of audible alarm 104 and/or one or more of the light features of light 106. Deactivation may refer to an absence of audible alarm 104, light 106, and/or other alerts so that attachable alarm system 100 is in an idle mode. Particular ones of the selection combinations may activate the different presentation patterns of light 106, change one or more of the light features, activate audible alarm 104, terminate the light features, terminate audible alarm 104, change audible alarm 104, and/or other actions.

The selection combinations may include one or more of selecting the button once, selecting the button twice, selecting the button thrice, holding down the button for a particular amount of time, and/or other selection combinations.

By way of non-limiting example, the selection combinations activating and deactivating audible alarm 104 and/or light 106 may include selecting button 108 once to activate the continuous light presentation, selecting button 108 twice to activate the flashing light presentation, holding down button 108 for the particular amount of time to activate audible alarm 104 upon audible alarm 104 being deactivated, holding down button 108 for the amount of time to deactivate audible alarm 104 upon audible alarm 104 being activated, among others. By way of non-limiting example, the termination selection combination of button 108 to terminate the light features emitted by light 106 may include selecting button 108 once and subsequently holding down button 108 for the particular amount of time (e.g., three seconds), and/or other selection combination of button 108.

Power switch 110 may be a button or a switch that is toggles from one side to another. Power switch 110 may be connected to audible alarm 104 and light 106. Power switch 110 may enable and disable possible activation of audible alarm 104 and the light 106 upon selection or toggle. In some implementations, power switch 110 may be disposed on circumference side 156 of housing 102 illustrated in FIG. 1B. In some implementations, power switch 110 may be disposed on second side 158 of housing 102 illustrated in FIG. 2 or first side 150 of housing 102.

Power switch 110 may enable function of audible alarm 104 and/or light 106 upon the selection combinations on button 108, as described herein. That is, upon power switch 110 being in an on-position, audible alarm 104 and/or light 106 may be effectuated upon one or more of the selection combinations on button 108. Conversely, upon power switch 110 being in an off-position, audible alarm 104 and/or light 106 may not be effectuated upon one or more of the selection combinations on button 108. In some implementations, upon effectuation of audible alarm 104 and/or light 106, a change of power switch 110 from the on-position to the off-position may immediately deactivate audible alarm 104 and/or light 106.

FIG. 1B illustrates a second front view of housing 102. Attachable alarm system 100 (of FIG. 5A-B) may include rechargeable battery 114 encased within housing 102, charging port 116, and/or other components. Rechargeable battery 114 may power audible alarm 104 (illustrated in FIG. 1A) and light 106. Rechargeable battery 114 may be recharged via charging port 116 and a compatible power cord (not illustrated). Rechargeable battery 114 may be a nickel-cadmium (NiCad), nickel-metal hydride (NiMH), and lithium-based batteries (e.g., lithium-ion), or other rechargeable battery. Charging port 116 may be disposed with housing 102 on circumference side 156 of housing 102. In some implementations, charging port 116 may be disposed with housing 102 on second side 158 of housing 102 (illustrated in FIG. 2). Attachable alarm system 100 may further include a battery light that is the same as or similar to light 106. The battery light may be configured to emit light in a manner that indicates a level of power remaining in rechargeable battery 114. The emitted light may indicate to a user that rechargeable battery 114 may have low power and/or require recharging. By way of non-limiting illustration, the battery light may emit one or more of a flashing light, a red light, and/or other combinations of light features, responsive to the rechargeable battery 114 reaching a threshold level of power. For example, the threshold level of power may be 10%, 15%, 20%, and/or other levels of power. The emitted light may indicate to a user that rechargeable battery 114 is fully charged. By way of non-limiting illustration, responsive to charging port 116 being coupled with a compatible power cord and/or rechargeable battery 114 being charged, the battery light may emit a green light and/or other combinations of light features, responsive to rechargeable battery 114 reaching full charge and/or near full charge.

Figure 2:
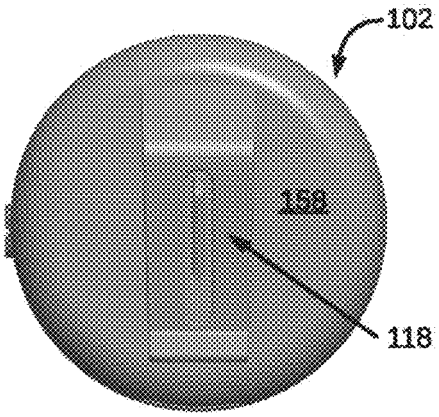
FIG. 2 illustrates a back view of the attachable alarm system, in accordance with one or more implementations.

FIG. 2 illustrates a back view of housing 102. The back view may depict second side 158 (referenced in FIG. 1A-B) of housing 102. Housing 102 may include a connector 118 that facilitates attachment and detachment to a carrier component 118, illustrated in FIG. 4A-B, and/or other carrier components that extend from housing 102. Carrier component 118 and/or other carrier components may enable attachment and detachment of housing 102 to the article or the user.

Figure 3:
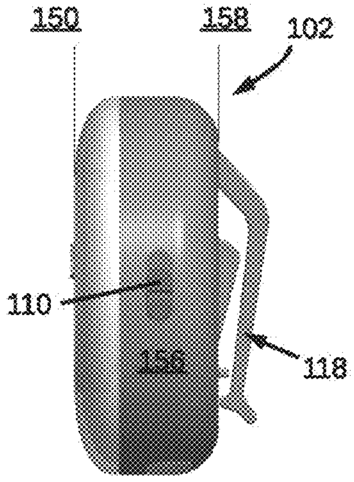
FIG. 3 illustrates a side view of the housing included in the attachable alarm system, in accordance with one or more implementations.
Figure 4A:
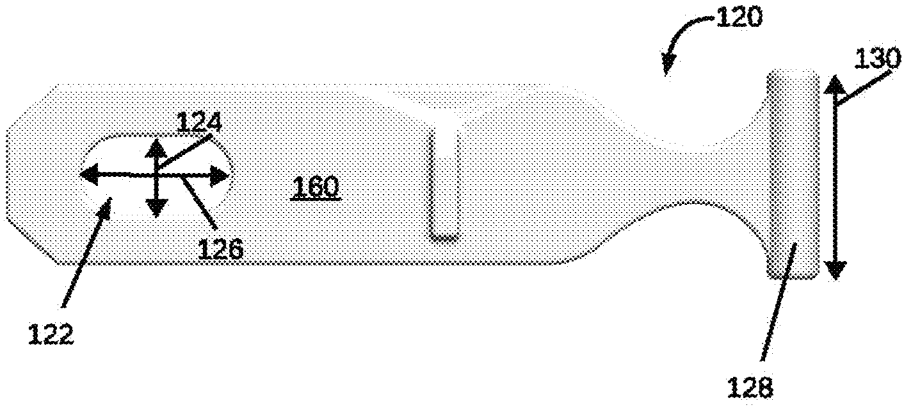
FIG. 4A illustrates a first side of a carrier component, in accordance with one or more implementations.
Figure 4B:
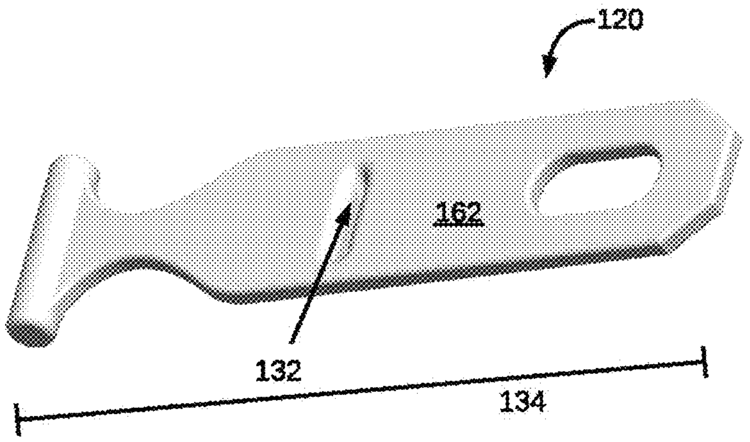
FIG. 4B illustrates a second side of the carrier component, in accordance with one or more implementations.

Referring to FIG. 2 and FIG. 3, connector 118 may include a clip attachment, a first magnet, screw threading, adhesive, and/or other connectors that facilitate attachment and detachment to carrier component 118 in FIG. 4A-B, the article, and/or the user. In some implementations, the clip attachment as connector 118 and/or other connectors make include a male fastener and a female fastener. The male fastener may be formed to unite and fasten into the female fastener, thus attaching housing 102 to carrier component 118 in FIG. 4A-B and/or the article. The male fastener may be un-united from the female fastener, thus detaching housing 102 from carrier component 118 in FIG. 4 and/or the article.

In some implementations, connector 118 may be one of the male fastener and the female fastener. For example, the male fastener or the female fastener may include the screw threading so that the screw threading may rotate housing 102 to unite with complementary screw threading. The complementary screw threading may rotate amidst the screw threading to secure the complementary screw threading and the screw threading together, and thus securing housing 102 to other carrier components. The other carrier components, in addition to or alternative to carrier component 118 in FIG. 4A-B, may include the complementary screw threading, a second magnet that unites with and secures to the first magnet, a wearable band, a strap, and/or other carrier components that enable the attachment and detachment of housing 102 to the article or the user.

The wearable band may include one or more pockets the encase housing 102. The wearable band may include an arm band, a headband, wristband, an ankle band, a leg band, and/or other wearable bands. The strap may attach to the article. FIG. 3 further illustrates circumference side 156 of housing 102 that is disposed with power switch 110. Power switch 110 and/or charging port 116 in FIG. 1B may be disposed upon different points around circumference side 156 of housing 102. FIG. 3 further illustrates first side 150 is opposite of second side 158, where circumference side 156 is perpendicular and in between first side 150 and second side 158.

FIG. 4A illustrates a first side 160 of carrier component 120. Carrier component 120 may include an opening 122 and a fastening component 128. Carrier component 120 may wrap around the article, described in FIG. 1A-B, so that a second side 162 illustrated in FIG. 4B is in contact with the article. Fastening component 128 may be manipulated to be smaller than a width 124 and a length 126 of opening 122 so that fastening component 128 may enter through opening 122. Upon entrance through opening 122, fastening component 128 may revert back to its original form.

Width 124 and length 126 may be less than a width 130 of fastening component 128 so that fastening component 128 does not displace away from opening 122 upon entering through opening 122 and reverting back to its original form. Thus, carrier component 120 may be secured to the article. Contrariwise, fastening component 128 may be manipulated to be smaller than width 124 and length 126 of opening 122 so that fastening component 128 may displace away from opening 122, thus detaching carrier component 120 from the article.

FIG. 4B illustrates second side 162 of carrier component 120. Carrier component 120 may include fastening component 132 that facilitates attachment of carrier component 120 to connector 118 of housing 102 illustrated in FIGS. 2-3. Fastening component 132 may act as the male fastener and the female fastener when united with connector 118 of housing 102 illustrated in FIGS. 2-3, thus securing housing 102 on carrier component 120. Length 134 of carrier component 120 may be 3 inches, 4 inches, 5 inches, or other length. In some implementations, material of carrier component 120 may be a stretchy silicone, plastic, or other material. In some implementations, material of carrier component 120 may be a rigid plastic, metal, or other material.

FIG. 5A illustrates attachable alarm system 100 that includes housing 102, described in FIG. 1A-B and FIG. 2-3, detached from carrier component 120 described in FIG. 4A-B.

FIG. 5B illustrates a first view of attachable alarm system 100 that includes housing 102, described in FIG. 1A-B and FIG. 2-3, attached to carrier component 120 described in FIG. 4A-B. Housing 102 may be attached to carrier component 120 by connector 118, described herein. First view of attachable alarm system 100 depicts a portion of light 106 described herein and power switch 110 described herein.

Figure 6:
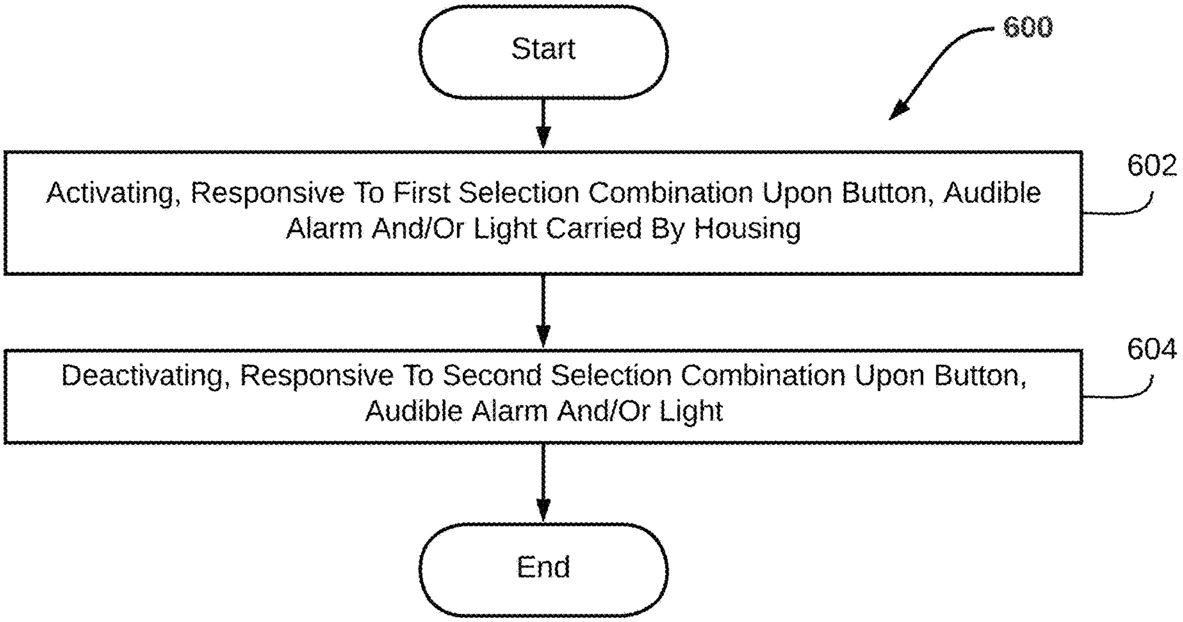
FIG. 6 illustrates a method for providing an alarm with an attachable alarm system, in accordance with one or more implementations.

FIG. 6 illustrates a method 600 to provide an alarm with an attachable alarm system, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

An operation 602 may include activating, responsive to a first selection combination upon a button, an audible alarm and/or a light carried by a housing, wherein the button is disposed with the housing, wherein the housing includes at least openings on the housing, wherein the light is configured to emit light features, wherein the attachable alarm system includes: a rechargeable battery, encased within the housing, that powers the audible alarm and the light, and a carrier component extended from the housing, wherein the carrier component enables attachment and detachment of the housing to an article or a user.

An operation 504 may include deactivating, responsive to a second selection combination upon the button, the audible alarm and/or the light. The housing and the carrier component, and components thereof, may be described as housing 102 and carrier component 120 in FIGS. 1A-B, FIG. 2, FIG. 3, FIG. 4A-B, and FIG. 5A-B. Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An attachable alarm system, the attachable alarm system comprising:

a housing having a circular profile, the housing formed with a first side attached to a second side, the second side being opposite the first side, the housing having openings on a button disposed on the first side which permit a delivery of an audible alarm sound to an ambient environment;

an audible alarm device carried by the housing and configured to emit the audible alarm sound;

a light carried by the housing and configured to emit light features, the light being configured to emit the light features around a perimeter of the button on the first side;

a rechargeable battery, encased within the housing, that powers the audible alarm device and the light;

the button disposed on the first side of the housing, wherein the button, upon different selection combinations, activates the audible alarm device to emit the audible alarm sound and/or the light to emit one or more of the light features; and a clip attachment protruding from the second side of the housing opposite the first side and formed as part of the second side, wherein the clip attachment enables attachment and detachment of the housing to a carrier component.

2. The attachable alarm system of claim 1, wherein the light surrounds the perimeter of the button on the first side of the housing.

3. The attachable alarm system of claim 1, further comprising the carrier component, and wherein the carrier component includes a wearable band.

4. The attachable alarm system of claim 1, wherein the light features include color, presentation patterns, and brightness, and wherein the presentation patterns include continuous light presentation, flashing light presentation, and perimeter movement presentation.

5. The attachable alarm system of claim 4, wherein the selection combinations include selecting the button once to activate the continuous light presentation, selecting the button twice to activate the flashing light presentation, holding down the button for an amount of time to activate the audible alarm sound, and holding down the button for the amount of time to deactivate the audible alarm sound.

6. The attachable alarm system of claim 1, wherein the housing includes a power switch that enables and disables activation of the audible alarm device and the light upon selection.

7. A method for controlling an attachable alarm system, the attachable alarm system comprising a housing having a circular profile, a first side attached to a second side, the second side being opposite the first side, openings on a button on the first side of the housing permitting a delivery of an audible alarm sound to an ambient environment, an audible alarm device configured to emit the audible alarm sound, a rechargeable battery, a light carried by the housing and configured to emit light features, the button on the first side of the housing, and a clip attachment protruding from a second side of the housing opposite the first side and formed as part of the second side, the method comprising:

activating, responsive to a first selection combination upon the button, the audible alarm device to emit the audible alarm sound and/or the light carried by the housing to emit one or more of the light features around a perimeter of the button on the first side; and deactivating, responsive to a second selection combination upon the button, the audible alarm device to cease emission of the audible alarm sound and/or the light to cease emission of the one or more of the light features.

8. The method of claim 7, wherein the first selection combination includes selecting the button once so that the audible alarm device and the light are activated.

9. The method of claim 8, wherein the second selection combination includes holding down the button for a particular amount of time so that the audible alarm device and the light are deactivated.

10. The method of claim 7, wherein the first selection combination includes selecting the button twice so that the light is activated.

11. The method of claim 7, wherein the second selection combination includes selecting the button twice so that the light is deactivated subsequent to being activated.

12. The method of claim 7, wherein the light features include color, a presentation pattern, and brightness, and wherein the presentation pattern is one of a continuous light presentation, a flashing light presentation, and a perimeter movement presentation.

13. The method of claim 7, wherein the attachable alarm system further includes a carrier component, and wherein the carrier component includes a wearable band.

14. The method of claim 7, wherein the light surrounds the perimeter of the button on the first side of the housing.

* * * * *